April 3, 1928.
C. C. JENSEN
1,664,687
CLAMP NAIL
Filed Feb. 4, 1927
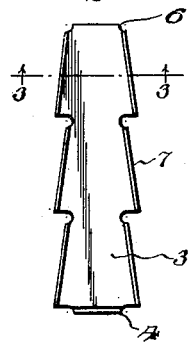
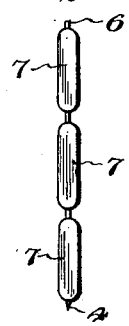
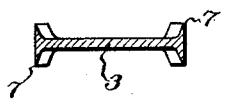
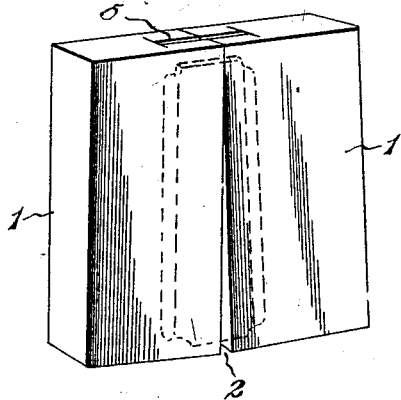
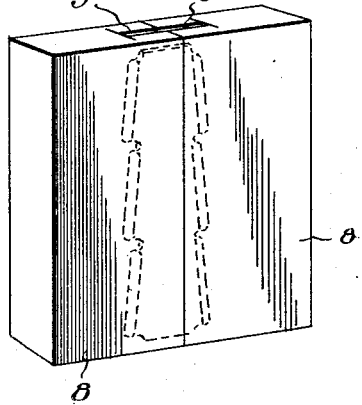
Inventor
C. C. Jensen
By Lacy & Lacy, Attorneys Patented Apr. 3, 1928.

1,664,687

UNITED STATES PATENT OFFICE.

CARL C. JENSEN, OF CHICAGO, ILLINOIS.

CLAMP NAIL.

Application filed February 4, 1927. Serial No. 165,921.

This invention relates to clamp nails and has for its object the provision of a nail which will firmly close both ends of a joint to which the nail is applied. The invention is illustrated in the accompanying drawing and will be hereinafter fully set forth.

In the drawing:

Figure 1 is a plan view of a clamp nail embodying the present invention;

Fig. 2 is an edge elevation of the same;

Fig. 3 is a section on the line 3—3 of Fig. 1;

Figs. 4 and 5 are perspective views of joints illustrating the application of the invention.

Clamp nails are employed to close the joints in furniture, boxes or other articles without the use of glue or other adhesives. The application of adhesives is objectionable and time-consuming and, moreover, is inefficient inasmuch as, in time, the glue or other adhesive dries and fails to close the joint members so that the joint opens and repairs are necessary. When a single clamp nail is applied to a joint, as indicated in Fig. 4, the members 1 of the joint are brought together at one end of the joint only, the opposite end of the joint being left open, as shown at 2. To overcome this defect, it has been customary to insert two clamp nails, one being driven into the joint from each side of the same, but this practice is time-consuming and expensive and is, therefore, unsatisfactory. The present invention provides a clamp nail which may be driven into the members of a joint from one side of the joint and will effectually secure the members together and close the joint throughout the entire extent of the same.

The clamp nail embodies a flat central web 3 which is provided at one end with a beveled or sharpened edge 4 whereby its entrance into and passage through the saw kerfs of the joint, indicated at 5, will be facilitated, and at its opposite end is provided with a blunt edge 6 adapted to receive blows from a hammer or other driving tool. On the side edges of the web 3 are formed flanges 7 which project from both faces of the web and are beveled, as shown clearly in Fig. 3, so that the edges of the flanges will form cutting edges to penetrate the side walls of the saw kerfs. As shown most clearly in Figs. 1 and 2, the flanges 7 are formed in series, the flanges of each series extending through a part of the length of the device and also converging toward the driving end of the same. The sets of flanges are preferably of equal length and arranged in the same manner so that the members of the several pairs of flanges will be spaced apart the same distance at their entering ends and also the same distance at their trailing ends.

When using a nail of the improved construction, the members of the joint, indicated at 8 in Fig. 5, are placed in contact as close as may be possible by hand, the usual saw kerfs 5 having been previously formed therein, and the nail is then engaged in the upper ends of the kerfs and driven downwardly through the joint members in the usual manner. The entering ends of the first pair of flanges immediately adjacent the entering end of the nail will, of course, engage the side walls of the kerfs and will tend to draw the joint members together. The successive pairs of flanges will, in turn, act upon the joint members in the same manner and it will thus be readily seen that, when the nail has been driven home, the shorter distance between the flanges will be acting upon the joint members at a plurality of points instead of at only one point as in the common construction heretofore used, the result being that the joint will be closed throughout its extent, as shown in Fig. 5. The greater clamping pressure is thus exerted upon the joint members at several points along the length of the joint without the application of clamp nails from opposite sides of the joint and a complete closing of the joint will be effected at one operation.

Having thus described the invention, I claim:

A clamp nail for closing joints comprising a web provided along its side edges with a plurality of pairs of flanges, the flanges of each pair converging in the direction from the driven end of the nail toward the driving end thereof with the corresponding ends of the members of the several pairs the same distance apart and from the medial longitudinal line of the web through the entire length of the nail whereby the successive flanges will successively engage the members of the joint and the closing pressure will be applied to the members of the joint uniformly throughout the entire length of the joint and a single nail will close both ends of the joint.

In testimony whereof I affix my signature.

CARL C. JENSEN. [L. S.]